United States Patent
Di Crescenzo et al.

(10) Patent No.: US 10,408,023 B2
(45) Date of Patent: Sep. 10, 2019

(54) EXPANDING WELL TUBULARS INTERCONNECTED BY PIN-BOX ASSEMBLIES OPTIMIZED FOR EXPANSION

(71) Applicant: SHELL OIL COMPANY, Houston, TX (US)

(72) Inventors: Daniele Di Crescenzo, New Orleans, LA (US); Serge Methieu Roggeband, Assen (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/855,214

(22) Filed: Dec. 27, 2017

(65) Prior Publication Data

US 2018/0119852 A1 May 3, 2018

Related U.S. Application Data

(63) Continuation of application No. PCT/EP2016/065172, filed on Jun. 29, 2016.

(30) Foreign Application Priority Data

Jul. 1, 2015 (EP) .................................. 15174880

(51) Int. Cl.
 *E21B 17/042* (2006.01)
 *E21B 43/10* (2006.01)
 (Continued)

(52) U.S. Cl.
 CPC ............ *E21B 43/108* (2013.01); *E21B 17/02* (2013.01); *E21B 17/1042* (2013.01);
 (Continued)

(58) Field of Classification Search
 CPC ...... E21B 17/02; E21B 17/042; E21B 43/103; E21B 43/106; E21B 43/108; F16L 13/147; F16L 15/04; F16L 15/08
 See application file for complete search history.

(56) References Cited

U.S. PATENT DOCUMENTS 2,094,691 A * 10/1937 Williams ............. C09K 3/1028
 138/97
RE30,647 E * 6/1981 Blose .................. E21B 17/0423
 285/332.2

(Continued)

FOREIGN PATENT DOCUMENTS

WO 2012104257 A1 8/2012
WO 2014154577 A1 10/2014

OTHER PUBLICATIONS

International Search Report and Written Opinion received for PCT Patent Application No. PCT/EP2016/065152, dated Sep. 23, 2016, 9 pages.

(Continued)

*Primary Examiner* — Daniel P Stephenson

(57) ABSTRACT

A pin-box well tubular connector assembly having pin and box connector members (6,5) with intermeshing external and internal screw thread profiles is optimized for expansion downhole in a wellbore by:
A) inserting a swellable dope in the gap between the pin and box connector members (6,5) and optionally
B) configuring the pin and box connectors (6,5) such that in axial direction a gap of at least 0.2 mm is present between the external and internal screw thread profiles; and/or
C) configuring the box connector member (5) such that it has at least one thread (10) that does not engage a thread on the pin member (6).

19 Claims, 3 Drawing Sheets

(51) Int. Cl.
    *F16L 15/04*     (2006.01)
    *F16L 15/08*     (2006.01)
    *E21B 17/02*     (2006.01)
    *E21B 17/10*     (2006.01)
    *F16L 13/14*     (2006.01)

(52) U.S. Cl.
    CPC .......... *E21B 43/103* (2013.01); *E21B 43/106* (2013.01); *F16L 15/04* (2013.01); *F16L 15/08* (2013.01); *F16L 13/147* (2013.01)

(56) References Cited

U.S. PATENT DOCUMENTS

| | | | | |
|---|---|---|---|---|
| RE34,467 E * | 12/1993 | Reeves | ............... | E21B 17/042 285/334 |
| 5,324,047 A * | 6/1994 | Organ | ............... | F16H 25/2418 277/354 |
| 6,409,175 B1 * | 6/2002 | Evans | ............... | E21B 17/042 277/314 |
| 6,811,189 B1 * | 11/2004 | DeLange | ............... | F16L 15/008 285/332.1 |
| 6,840,325 B2 * | 1/2005 | Stephenson | ............... | E21B 17/042 166/207 |
| 6,971,685 B2 * | 12/2005 | Hashem | ............... | E21B 17/042 285/333 |
| 6,997,264 B2 * | 2/2006 | Simpson | ............... | E21B 17/04 166/207 |
| 7,380,840 B2 * | 6/2008 | Sivley, IV | ............... | E21B 43/106 285/334 |
| 7,578,043 B2 * | 8/2009 | Simpson | ............... | E21B 17/042 166/207 |
| 8,177,262 B2 * | 5/2012 | Sivley, IV | ............... | E21B 43/106 285/334 |
| 8,668,233 B2 * | 3/2014 | Mallis | ............... | F16L 15/004 285/333 |
| 9,657,555 B2 * | 5/2017 | Delange | ............... | E21B 43/106 |
| 9,863,560 B2 * | 1/2018 | Durivault | ............... | E21B 17/0423 |
| 9,926,749 B2 * | 3/2018 | Bennett | ............... | E21B 17/042 |
| 2004/0017081 A1 * | 1/2004 | Simpson | ............... | E21B 17/042 285/333 |
| 2004/0060706 A1 | 4/2004 | Stephenson et al. | | |
| 2005/0212290 A1 | 9/2005 | Durand et al. | | |
| 2006/0006647 A1 * | 1/2006 | Hashem | ............... | E21B 43/103 285/333 |
| 2007/0102927 A1 | 5/2007 | Dubedout et al. | | |
| 2012/0049462 A1 * | 3/2012 | Pitman | ............... | F16J 15/068 277/314 |
| 2013/0312954 A1 * | 11/2013 | Di Crescenzo | ..... | E21B 33/1292 166/207 |
| 2018/0119852 A1 * | 5/2018 | Di Crescenzo | ....... | E21B 43/103 |

OTHER PUBLICATIONS

International Search Report and Written Opinion received for PCT Patent Application No. PCT/EP2016/065172, dated Sep. 19, 2016, 9 pages.

\* cited by examiner

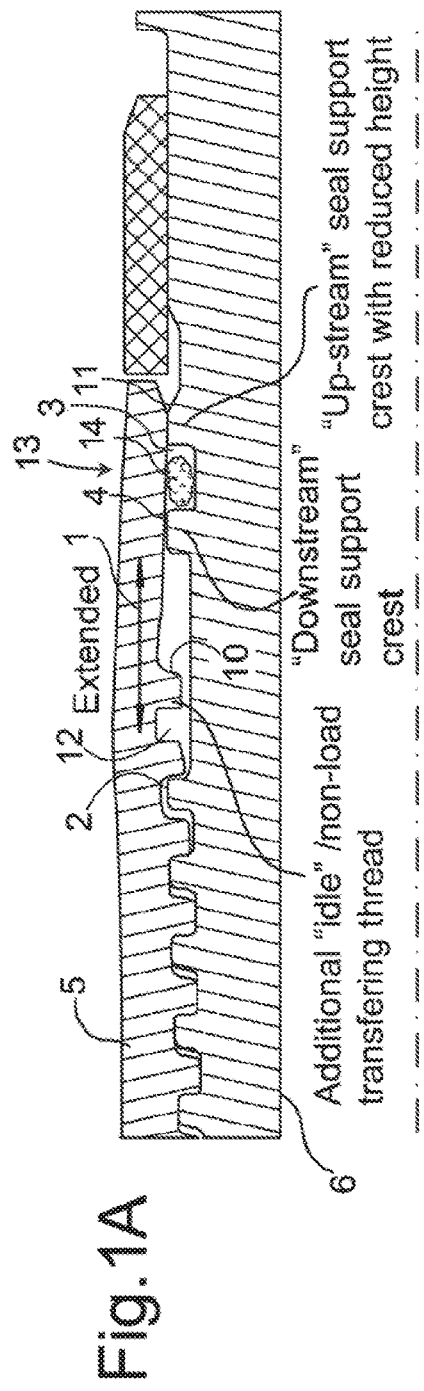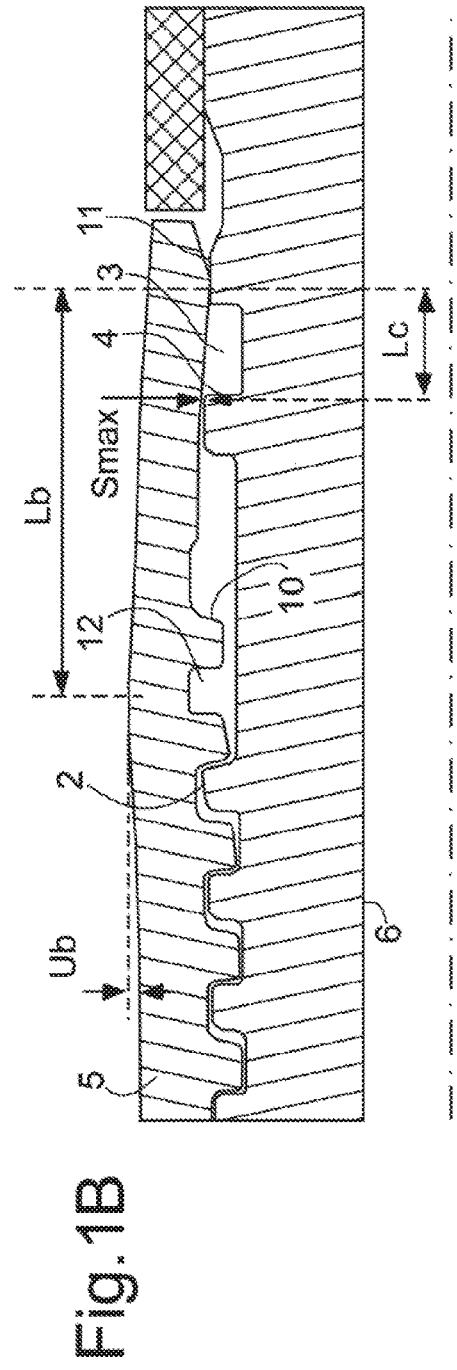
Fig. 1A
Fig. 1B

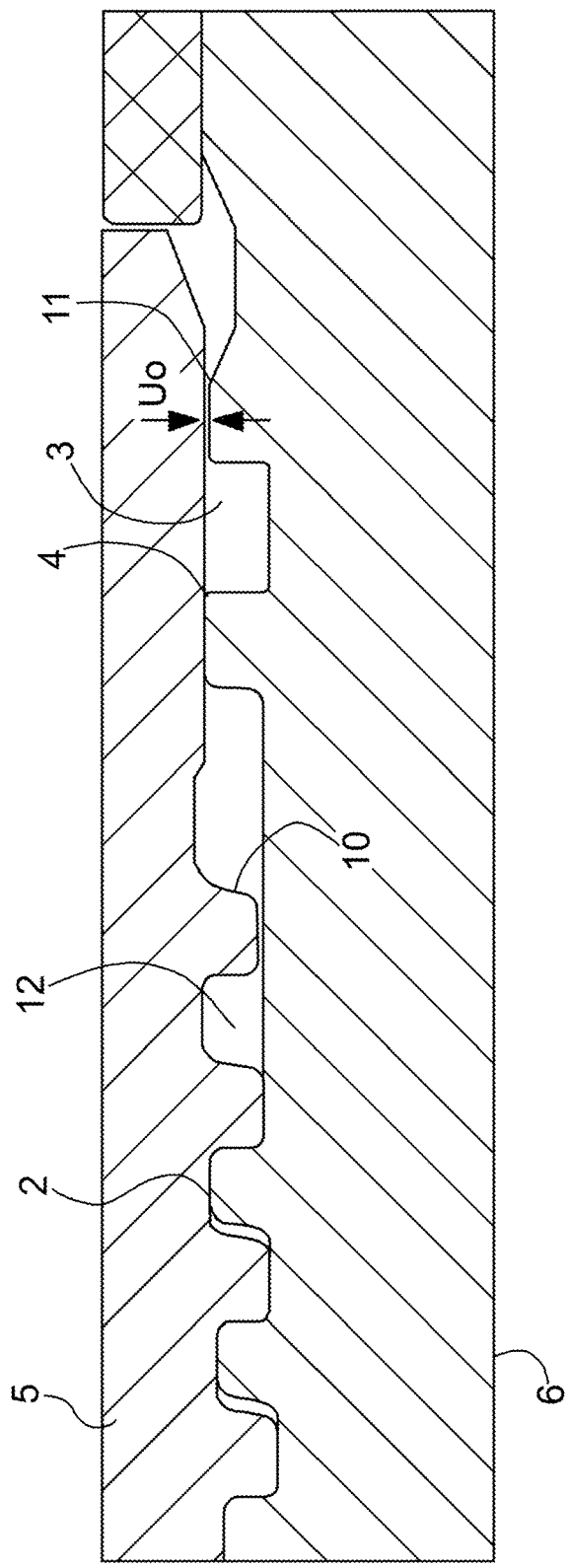

US 10,408,023 B2

EXPANDING WELL TUBULARS INTERCONNECTED BY PIN-BOX ASSEMBLIES OPTIMIZED FOR EXPANSION

CROSS REFERENCE TO EARLIER APPLICATION

This is a Continuation application of International Application PCT/EP2016/065172, filed 29 Jun. 2016, which claims priority of European application 15174880.3, filed 1 Jul. 2015.

FIELD OF THE INVENTION

The invention relates to a method for expanding well tubulars interconnected by pin-box assemblies. The invention further relates to a well tubular assembly for use in this method, and a pin-box connector assembly.

BACKGROUND OF THE INVENTION

In the method of US 2013/312954 A, a well tubular is expanded downhole in a wellbore of an oil and/or gas production well by mechanically pulling or hydraulically pushing an expansion cone therethrough.

When a pair of tubulars interconnected by a pin-box screw thread connector assembly is expanded this generates high stresses in the assembly when the expansion cone is pulled or pushed therethrough, which may cause the screw thread assembly to leak and/or fail.

There is a need for an improved method and system for expanding well tubulars interconnected by pin-box assemblies that are optimized for expansion.

SUMMARY OF THE INVENTION

In accordance with the invention there is provided a method for expanding a pair of well tubulars that are interconnected by a pin-box connector assembly comprising pin and box connector members with intermeshing external and internal screw thread profiles, the method comprising:
inserting a swellable dope in the gap between the pin and box connector members;
interconnecting the pair of well tubulars by means of the optimized pin-box connector assembly; and
radially expanding the interconnected well tubulars by moving an expansion cone therethrough.

In accordance with the invention there is furthermore provided a well tubular assembly for use in the above method; and a pin-box connector assembly comprising pin and box connector members with intermeshing external and internal screw thread profiles, which pin and box connector members each have base and tip sections that are configured such that, when threaded together, a base section of the pin connector member engages a tip section of the box connector member and a tip section of the pin connector member engages a base section of the box connector member, wherein a seal groove is provided in the base section of the box connector member between a down-stream seal support crest and an up-upstream seal support crest, wherein the box connector member has an extended tip section, wherein a radial height of the up-stream seal support crest is reduced compared to the radial height of the down-stream support crest, such that a contact point with the box member is lowered radially inwards.

These and other features, embodiments and advantages of the well tubular expansion method, expandable well tubular and well tubular assembly according to the invention are described in the accompanying claims, abstract and the following detailed description of non-limiting embodiments depicted in the accompanying drawings, in which description reference numerals are used which refer to corresponding reference numerals that are depicted in the drawings.

Similar reference numerals in different figures denote the same or similar objects. Objects and other features depicted in the figures and/or described in this specification, abstract and/or claims may be combined in different ways by a person skilled in the art.

BRIEF DESCRIPTION OF THE DRAWINGS

FIGS. 1A-C show an expandable pin-box well tubular connection assembly.

DETAILED DESCRIPTION OF THE DEPICTED EMBODIMENTS

Figure 2:
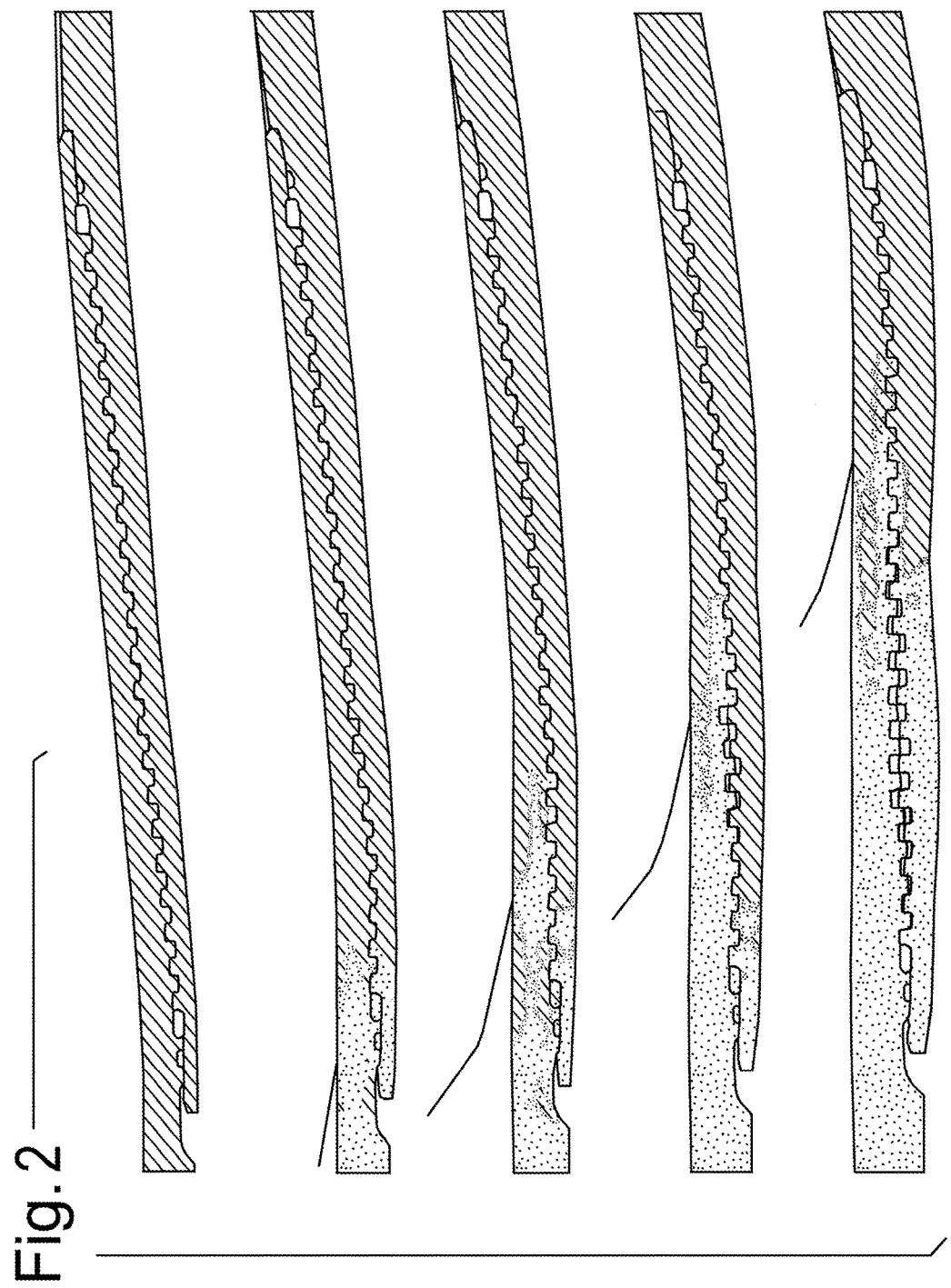
FIG. 2 shows how an pin-box well tubular connection assembly is deformed during the expansion process.

Proposed herein is an expandable pin-box well tubular connection assembly which is optimized for expansion, for example within an oil and/or gas production well. The disclosure features a method and system for expanding well tubulars interconnected by pin-box assemblies that are optimized for expansion.

The assembly, which uses pin and box connector members with intermeshing external and internal screw thread profiles, may be optimized by inserting a swellable dope in the gap between the pin and box connector members. The pipe dope may swell upon contact with a wellbore fluid and/or heating during the expansion process.

The pin and box connector members may each have base and tip sections that are configured such that a base section of the pin connector member engages a tip section of the box connector member and a tip section of the box member engages a base section of the pin member. The box connector member may further have an extended tip section.

A seal groove may be provided in the base section of the box connector member between a down-stream seal support crest and an up-upstream seal support crest. A radial height of the up-stream seal support crest may be lower compared to the radial height of the down-stream support crest, such that a contact point with the box member is lowered radially inwards.

After expanding, a ring-shaped sealing lip may engage with the up-stream crest, and thereby create a ring-shaped sealing shoulder at the base section of the pin member.

Optionally the pin and box connector members may further be optimized for expansion by configuring the pin and box connector members such that in axial direction a gap of at least 0.2 mm, optionally between 0.3 and 0.5 mm, is present between the external and internal screw thread profiles and/or by configuring the box connector member such that it has at least one thread that does not engage a thread on the pin connector member. The at least one thread of the box connector member that does not engage a thread on the pin connector member may be an idle thread that forms part of the extended tip section of the box connector member. The swellable pipe dope may be inserted between the pin and box connector members.

The tubulars may be expanded using an expansion mandrel which is mechanically pushed or pulled or hydraulically pumped through the tubulars. Also a combination of mechanical or hydraulic action is possible. The expandable tubulars are connected by means of threaded connections, which are also expanded. The threaded connection consists of a male, or pin, member, which has external threads. The female or box member of the connection has internal threads. The connection may have multiple seal features, like O-rings in addition to the threads. On assembly the prior to expansion, the box and pin member are screwed into each other. The design of threaded connections for expandable tubulars has to take into account many conflicting requirements that arise from the deployment in an oil or gas well, during the expansion and during the post-expansion well functional life.

Typically the connections for use in expandable applications preferably have a near flush internal or external profile as compared to the bodies of the tubulars that they connect. This avoids that a significant increase of the expansion force occurs while expanding through the connections. On the other side the connection preferably has a mechanical strength which is matching that of the pipe body and also is pressure tight under the acting loads. This is also more difficult to achieve for a slim connection as for a connection, which has a thicker profile than the pipe body.

The expansion mandrels used for tubular expansion typically consist of a sequence of multiple sections over which the pipe is transformed from is unexpanded to its final expanded state, for example a sequence of cylindrical, concave rounded, conical, or convex rounded sections can be used. Also a more continuously varying mandrel geometry can be used.

FIG. 2 illustrates the deformation of an expandable tubular when the expansion cone is progressed through it. However, for convenience of the discussion, the cone is considered stationary and while the pipe is then assumed to flow over it. As the tubular material flows over the mandrel surface, the inner diameter of the pipe continuously increases and the wall thickness decreases.

Next to the radial expansion of the material, also bending effects occur. At the front of the expansion mandrel the material is bent form the undeformed straight shape, into a curved transition shape and then bent back straight again as it reaches up the predominant conical section of the mandrel. During this bending cycle material on the outside of the pipe is first compressed in axial direction and is thereafter elongated again. Material on the inside wall undergoes the reverse cycle. Another bending cycle is incurred when the pipe runs over the transition zone from the predominantly conical section to the final diameter of the mandrel. During this cycle, material on the outside of the pipe is first elongated in axial direction, and is subsequently compressed again when reaching is final expanded state.

When the connection is expanded by the mandrel then it has to follow nominally the same motion, but here also a relative motion between the threads of the pin and box members can occur. Threads can partly separate during and after the expansion. In addition, there can be residual clearance between the threads or at the areas of the connection where the sealing function is to be provided. For this reason many of the reported prior art connections have seal features at the extreme positions of the box and pin members, in order to have a separation of functions. The thread section in between the seals, takes account for the load mechanical transfer. In prior art the optimization of the cone shape and thread shapes have been discussed to minimize distortion of the connection geometry during and after expansion.

In addition, the connection must also provide in a sealing function. For this, it is required that the in the areas where the sealing function of a connection is to be provided, that there exists an interference or minimal gap between the pin and box members.

A further point that has to be taken into account is that the in-situ load conditions can vary, under which a connection is being expanded in a well. The combination of the in-situ loads in the well and the expansion forces affect the plastic straining during expansion and thus the post-expansion geometry, mechanical and sealing integrity of a connection.

Gravity loads act on the length of the expandable string. During the expansion of the tubulars and connections at the bottom of an expandable tubular string this induces compression in the liner just above the zone, which is actively being expanded. This compression also has to be transferred through the zone of active straining, down to the support point of the liner to the formation. The compression therefore is transferred through the connection as it is being expanded.

During the expansion at the top of an expandable liner string then no or only a small compression is to be transferred through the connections while they are being expanded.

When a tubular is expanded, it has the natural tendency to shorten in axial length. This may generate a situation where the expansion takes place under conditions that the natural shortening of the liner during expansion is restricted. This can occur when the liner gets stuck both below above the zone where active expansion takes place. As a result of this a high tensile force develops in the liner. This means that also this high tensile force is transferred through the connections while they are being expanded. These expansion conditions are called fixed-fixed conditions.

The expandable connections of prior art expandable tubular assemblies are generally designed such that prior to expansion, there is a tight engagement of the threads on the pin and the box members. The engagement after assembly is at least in radial direction, and at least on one of the flanks in axial direction. The axial clearance between the threads is incorporated in the design to compensate for machining tolerances and elastic deformations of the thread geometry during assembly. This will allow taking both expansion loads and compressions load, without causing motion due to any axial play in the threads.

The in-situ tension conditions or compression conditions remain to act during the expansion of a connection. Generally it is not certain whether the fixed-fixed condition will actually occur, and therefore the design should be capable of being expanded under both compression conditions as under the high tensile conditions.

Prior art connections can use elastomeric seal rings incorporated in concentric grooves at in the base section of the pin or box member of the connection. Such known arrangements would prevent pressure or fluids to penetrate from the bore of the expandable tubular into the annular cavity between the pin and box. The seal ring and the groove can be or other cross sectional shapes, like square, x-ring or Chevron seal. A dovetail groove shape may also be applied.

A connection that is expanded under high tension conditions, as occurs during fixed-fixed conditions, generally may induce an axial separation of the threads. This may be simulated using finite element calculations and is also observed in actual connections that are expanded under these conditions. The reason is that the cross section under a thread root stretches axially relatively to the cross section on the opposing member having the thread. In addition, the box member may become strongly deformed radially outwards at the last thread before the tip section. Further analysis showed that this outward movement/deformation of the box is caused by the high load transfer by the last thread during the final bending cycle as the connection is being expanded by the expansion mandrel. The high contact load on the last thread induces a bending moment, which cannot be resisted by the local relatively thin tip section of the box. As a result the tip section of the box bends outwards locally and thereby also stretching the material of the box member in circumferential direction over a length along the tip section.

This outward deformation of the box tip section at the last thread can cause a reduction or even the loss of seal contact and thus the loss of connection sealing integrity of prior art connections.

For a high pressure capability it is however required that any gap to be bridged by a seal is minimized, such that the seal means is not extruded into such a gap and damaged under the acting external pressure. It is the objective of the current invention to reduce minimize the gap at an external seal between the pin and box member, when expanding the connection under fixed-fixed conditions.

This is achieved in accordance with the invention by the extended lip shown in FIGS. 1A-C in which the box axial distance 1 is extended between the last thread 2 on the pin member 6 and the seal groove 3, significantly beyond the length strictly needed for a thread run-out (about on pitch length of the thread) and for the seal groove 3 and "down-stream" seal support crest 4. The extended length causes that any outward movement of the box member 5 can be transferred with less rotation of the box towards the seal. In addition the hoop strength of the tip section 13 of the box member 5 increases.

Adding the extended length enables in accordance with the invention to generate one or more additional "idle" thread windings 10 on the interior in of the box member 5. These threads 10 are "idle" in the sense that these threads 10 are not engaged or not transferring loads with any threads on the pin member. The advantage of the idle threads 10 is that they effectively increase the longitudinal cross section area and thus the strength of the tip section of the box in hoop direction, and thus provide a higher resistance against the bending induced by the load transfer at the last engaged thread.

Furthermore the outer diameter of the "up-stream" seal support crest 11 may be reduced such that the contact point with the box member 5 is lowered radially inwards.

The extended length in a preferred embodiment fulfills the following criterion. The gap at the "Down-stream" seal support crest 4, into which a seal can be extruded is denoted by $S_{max}$ and is generally prescribed by seal manufacturers in dependence of a the characteristic cross section dimension of the seal, the material hardness and the pressure to be sealed. A typical value for O-ring seals with a chord diameter of 1-3 mm is a maximum radial gap with $S_{max}$=0.05 mm.

Referring to FIG. 1B with the outward radial movement of the box is denoted by $U_b$, and the axial length $L_c$ between "Down-stream" seal support crest 4 and the contact point between the box and the pin member then the extended length of the box has the preferential length:

$$L_b \geq (U_b - U_0)/S_{max} \times Lc$$

wherein $U_0$ denotes the degree by which the radial height of the "up-stream" seal support crest has been lowered, as shown in FIG. 1C.

Groove 3 for a seal means between the pin and the box members 5 and 6 may be filled with a swellable dope 14, such as a swellable elastomer, rather than a conventional resilient seal. The swellable elastomer may be applied by brushing or spraying at a well site or at a tubing manufacturing or storage site. Also other cavities 12 between the pin and box members. may thus be filled with a swellable elastomer. The swellable elastomer is applied when assembling the connection. The swellable elastomer swells when it comes in contact with the well bore fluids and/or is heated by the friction between the expansion cone and expanded tubular string and therefore is able to compensate any created clearance. The amount by which such an elastomer can swell may be limited, and may be a fraction of the initial thickness in the as assembled state prior to expansion. Therefore, it is advantageous that the optimized pin-box design contains, preferably concentric, grooves or an alternative cavity space, which will allow for a large volume of swellable elastomer to be contained and a large clearance to be bridged by means of swell. The depth of the groove is preferably such that the remaining cross sectional area underneath the elastomer filled groove is equal to or exceeds the area under the root of the last engaged thread. To this end a groove may be cut in the box member 5, opposite to the tip of the pin member 6.

Experiments were performed whereby a pin box connector assembly provided with a swellable dope was expanded and was thereafter subjected to differential pressure with water. This allowed the elastomer in the grooves to swell and bridge the gap. It is further seen that the expansion has created a clearance around the threads, but locally there was insufficient swellable elastomer present that this gap could be closed.

When expanding a connection under in-situ compression conditions in a well, then this compression has to be transferred through the connection during the expansion. The compression load affects the deformations that occur in the connection during expansion. In prior art expandable connections this results in a radial separation between threads of the pin and the box member. This also induces a separation near the external seal area at the box tip section, which could further result in a leakage.

The stab-flank/compression flank angle of prior art connections can be reduced in order to make the flanks more perpendicular to the center line of the connection. However, such a modification has limited effect on the separation occurring during expansion under compression conditions. Also it has to be taken into account that the combination of a conical thread arrangement (as most prior art connections have) and a negative stab flank of the thread shape cannot always be screwed in.

Further analysis showed that the separation of the threads occurs during the later stages of the expansion. Initially, the final threads of the box are still in good engagement when the largest section of the expansion mandrel passes along and the tip section of the box member has already been expanded to the final diameter. The thread separation occurs later when the parts further along the threaded section and towards the tip of the pin member become fully expanded. The fundamental reason for the radial thread separation is that both the pin and the box member shorten during expansion. However under compression conditions the shortening of the pin member is a fraction larger than that of the box member. In relative terms therefore the pin member shortens, while the box member tends to restrict this. The threads at the fully expanded section remain axially interhooked and as a result a compressive force in the box develops. The thickness of the box near the tip area, and therefore the compressive strength is less than those in the opposing base section of the pin. As a result of the renewed plastic deformation in the form of axial shortening occurs in the box. Because the volume of steel is retained, the box member also displaces radially outwards, i.e. belling out of the box member. This latter response causes a radial separation of the pin and box threads and a separation of the seal.

The optimized pin-box assembly may reduce or avoid the radial separations of the threads when expanding the pin-box assembly under compression conditions.

This may be achieved by introducing in the design an axial play of at least 0.2 mm, optionally between 0.3 and 0.5 mm, between the threads of the pin and the box member as shown in FIGS. 1 and 2. The degree of axial play can be adjusted such that after expansion there is limited axial contact along the threads, while high compression forces in the box are avoided and yield limits are not exceeded.

The axial thread play is to compensate for the effect that during the expansion of a threaded connection under compression, the axial shortening of the pin member of the connection is larger than that of the box member.

This differential shortening generates an incompatibility (with high internal forces generated in the connection, if not mitigated by the invention) which is proportional to both:
1: the axial length L_eng along which the threads on both members are engaged,
2: the expansion ratio Exp_rat, which is defined as (ID_after_exp/ID_before_exp−1)×100%.

The pipe and connection were expanded from an initial 8.755 inch (222.377 mm) inner diameter to an expanded 10.2 inch (259.08 mm) inner diameter.

Therefore, the expansion ratio Exp_rat=(10.2/8.755−1)× 100%=16.5. The design has an axial thread engagement length of about 115 mm.

In a first design I, an axial play of about 0.41 mm was applied on the threads before expansion. The resulting connection shape after expansion was simulated using a finite element simulation technique to model the expansion process which indicated that at all threads there still exists an amount of play after expansion. Therefore, the initial amount of axial play given was still a bit too large.

In a second further optimized thread design II the axial play on the threads before expansion was reduced to about 0.37 mm. The above described finite element simulation technique was also used to generate the calculated post expansion geometry and axial gaps at both sides of the threads.

The finite element simulation technique indicated that this second thread design II is already "axially locked" in the sense that the pin member threads on the extreme right side of the connection are in contact at the left (stab) flank of thread, while the threads at the extreme left side of the thread are in contact on right (load) flank of the thread.

The finite element simulation technique indicated that an optimised thread should have an initial play which about fulfills the condition:

$$\text{Axial\_thread\_play} = \text{Exp\_Rat} \times L\_\text{eng} \times 0.37/(115 \times 16.5)$$
$$= 5100 \times \text{Exp\_Rat} \times L\_\text{eng}$$

Wherein the feature Exp_Rat is specified in % and L_eng in mm.

The finite element simulation technique furthermore indicated that a thread design with less axial play will develop compressive loading in the box after expansion.

It is observed that this axial play is significantly more than the axial play required for free running during assembly or for compensating machining inaccuracies within generally used specifications of threads for interconnecting oilfield tubulars.

The well tubulars may be expanded to generate a Mono Diameter(MOD) wellbore section with a substantially constant internal diameter of a hydrocarbon fluid production well, through which, after completion of the well, a larger flux of crude oil, natural gas and/or another hydrocarbon fluid can be produced than through conventional telescoping wells, and/or which can reach formation layers from which no hydrocarbon fluid can be economically produced with conventional telescoping wells.

Optionally, at least 10 adjacent pairs of well tubulars are each interconnected at a wellhead by the screw threaded pin-box assemblies to an elongate upper expandable tubular string having a length between 200 and 2000 meters and the elongate expandable tubular string is expanded downhole by moving an expansion cone therethough.

Subsequently:
  a subsequent lower wellbore section having a length between 200 and 2000 meters may be drilled below a lower end of the expanded tubular string;
  at least 10 adjacent pairs of lower well tubulars are each interconnected at the wellhead by the screw threaded pin-box assemblies to an additional lower expandable tubular string having a length between 200 and 2000 meters;
  the additional lower expandable tubular string is lowered through the expanded upper tubular string until an area of overlap between the upper and lower tubular strings has a length between 10 and 100 meters, optionally between 30 and 70 meters; and
  the lower expandable tubular string is expanded downhole by moving an expansion cone therethrough, thereby expanding the lower tubular string in the area of overlap against the upper tubular string such that the lower expandable tubular string has after expansion thereof, except in the area of overlap, an internal width substantially similar to an internal width of the expanded upper tubular string.

Therefore, the method, system and/or any products according to present invention are well adapted to attain the ends and advantages mentioned as well as those that are inherent therein.

The particular embodiments disclosed above are illustrative only, as the present invention may be modified, combined and/or practiced in different but equivalent manners apparent to those skilled in the art having the benefit of the teachings herein.

Furthermore, no limitations are intended to the details of construction or design herein shown, other than as described in the claims below.

It is therefore evident that the particular illustrative embodiments disclosed above may be altered, combined and/or modified and all such variations are considered within the scope of the present invention as defined in the accompanying claims.

While any methods, systems and/or products embodying the invention are described in terms of "comprising," "containing," or "including" various described features and/or steps, they can also "consist essentially of" or "consist of" the various described features and steps.

All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

Also, the terms in the claims have their plain, ordinary meaning unless otherwise explicitly and clearly defined by the patentee.

Moreover, the indefinite articles "a" or "an", as used in the claims, are defined herein to mean one or more than one of the element that it introduces.

If there is any conflict in the usages of a word or term in this specification and one or more patent or other documents that may be cited herein by reference, the definitions that are consistent with this specification should be adopted.

What is claimed is:

1. A method for expanding a pair of well tubulars that are interconnected by a pin-box connector assembly comprising pin and box connector members with intermeshing external and internal screw thread profiles, the method comprising:
configuring the pin and box connector members such that they are optimized for expansion by inserting a swellable pipe dope in a gap between the pin and box connector members, wherein said pin and box connector members each have base and tip sections that are configured such that a base section of the pin connector member engages a tip section of the box connector member and a tip section of the pin connector member engages a base section of the box connector member, wherein a seal groove is provided in the base section of the box connector member between a down-stream seal support crest and an up-upstream seal support crest, wherein the box connector member has an extended tip section, wherein a radial height of the up-stream seal support crest is reduced compared to the radial height of the down-stream support crest, such that a contact point with the box member is lowered radially inwards;
interconnecting the pair of well tubulars by means of the optimized pin-box connector assembly; and
radially expanding the interconnected well tubulars by moving an expansion cone therethrough.

2. The method of claim 1, wherein after expanding a ring-shaped sealing lip of the extended tip section engages with the up-stream crest, which thereby forms a ring-shaped sealing shoulder at the base section of the pin connector member.

3. The method of claim 1, wherein the down-stream seal support crest is located between the up-stream seal support crest and the internal screw thread profile.

4. The method of claim 1, wherein the method furthermore comprises configuring the pin and box connector members such that in axial direction a gap of at least 0.2 mm is present between the external and internal screw thread profiles.

5. The method of claim 1, wherein the swellable pipe dope swells upon contact with a wellbore fluid and/or heating during the expansion process.

6. The method of claim 5, wherein the swellable pipe dope fills upon swelling at least a substantial part of an annular space at the extended tip section of the box connector member within the ring-shaped sealing lip that engages the ring-shaped sealing shoulder at the base section of the pin connector member.

7. The method of claim 1, wherein a base section of the pin connector member is configured in a substantially similar mirrored manner as the tip section of the box connector member and the well tubulars are expanded within a wellbore through which, after well completion, crude oil, natural gas and/or other hydrocarbon fluids are produced.

8. The method of claim 7, wherein the well tubulars are expanded to generate a Mono Diameter(MOD) casing or liner assembly with a substantially constant internal diameter of a hydrocarbon fluid production well, through which, after completion of the well, a larger flux of crude oil, natural gas and/or another hydrocarbon fluid can be produced than through conventional telescoping wells, and/or which can reach formation layers from which no hydrocarbon fluid can be economically produced with conventional telescoping wells.

9. The method of claim 1, wherein the pin-box connector assembly is provided with a concentric seal groove filled with the swellable pipe dope.

10. A well tubular assembly for use in the method according to claim 1, the well tubular assembly comprising a screw threaded pin-box connector assembly wherein a swellable pipe dope is inserted between the pin and box connector members.

11. The well tubular assembly of claim 10 wherein the swellable pipe dope swells upon contact with a wellbore fluid and/or heating during the expansion process.

12. A method for expanding a pair of well tubulars that are interconnected by a pin-box connector assembly comprising pin and box connector members with intermeshing external and internal screw thread profiles, the method comprising:
configuring the pin and box connector members such that they are optimized for expansion by inserting a swellable pipe dope in a gap between the pin and box connector members, wherein
the pin and box connector members each have base and tip sections that are configured such that a base section of the pin connector member engages a tip section of the box connector member and a tip section of the pin connector member engages a base section of the box connector member, and
the box connector member has an extended tip section that comprises a ring-shaped sealing lip that engages a ring-shaped sealing shoulder at the base section of the pin connector member;
wherein the at least one thread of the box connector member that does not engage a thread on the pin connector member is an idle thread that forms part of the extended tip section of the box connector member
interconnecting the pair of well tubulars by means of the optimized pin-box connector assembly; and
radially expanding the interconnected well tubulars by moving an expansion cone therethrough.

13. A well tubular assembly for use in the method according to claim 12, the well tubular assembly comprising a screw threaded pin-box connector assembly wherein a swellable pipe dope is inserted between the pin and box connector members.

14. The well tubular assembly of claim 13 wherein the swellable pipe dope swells upon contact with a wellbore fluid and/or heating during the expansion process.

15. A pin-box connector assembly comprising pin and box connector members with intermeshing external and internal screw thread profiles, which pin and box connector members each have base and tip sections that are configured such that, when threaded together, a base section of the pin connector member engages a tip section of the box connector member and a tip section of the pin connector member engages a base section of the box connector member, wherein a seal groove is provided in the base section of the box connector member between a down-stream seal support crest and an up-upstream seal support crest, wherein the box connector member has an extended tip section, wherein a radial height of the up-stream seal support crest is reduced compared to the radial height of the down-stream support crest, such that a contact point with the box member is lowered radially inwards.

16. The pin-box connector assembly of claim 15, wherein after expanding a ring-shaped sealing lip of the extended tip section engages with the up-stream crest, which thereby forms a ring-shaped sealing shoulder at the base section of the pin connector member.

17. The pin-box connector assembly of claim 15, wherein the down-stream seal support crest is located between the up-stream seal support crest and the internal screw thread profile.

18. The pin-box connector assembly of claim 15, further comprising a swellable pipe dope inserted between the pin and box connector members.

19. The pin-box connector assembly of claim 18, wherein the seal groove is concentric to the pin-box connector assembly and filled with the swellable pipe dope.

* * * * *